L. B. CHERRY.
ELECTRICAL APPARATUS FOR THE ELECTROCHEMICAL TREATMENT OF LIQUID HYDROCARBON AND OTHER COMPOUNDS.
APPLICATION FILED FEB. 26, 1916.
1,327,023. Patented Jan. 6, 1920.
3 SHEETS—SHEET 1.
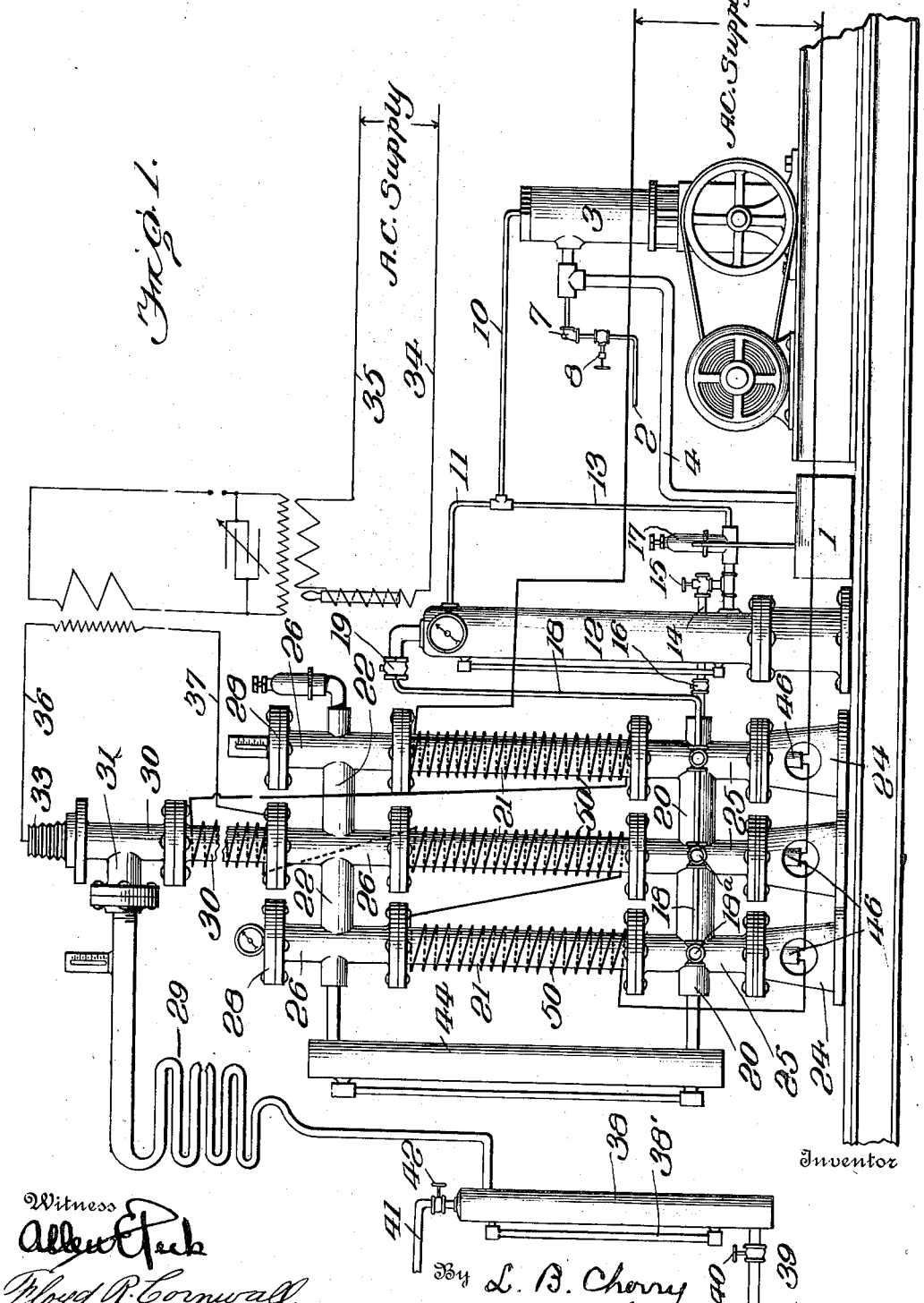
Witness
Albert Peck
Floyd R. Cornwall
Inventor
By L. B. Cherry
Hubert Peck
Attorney

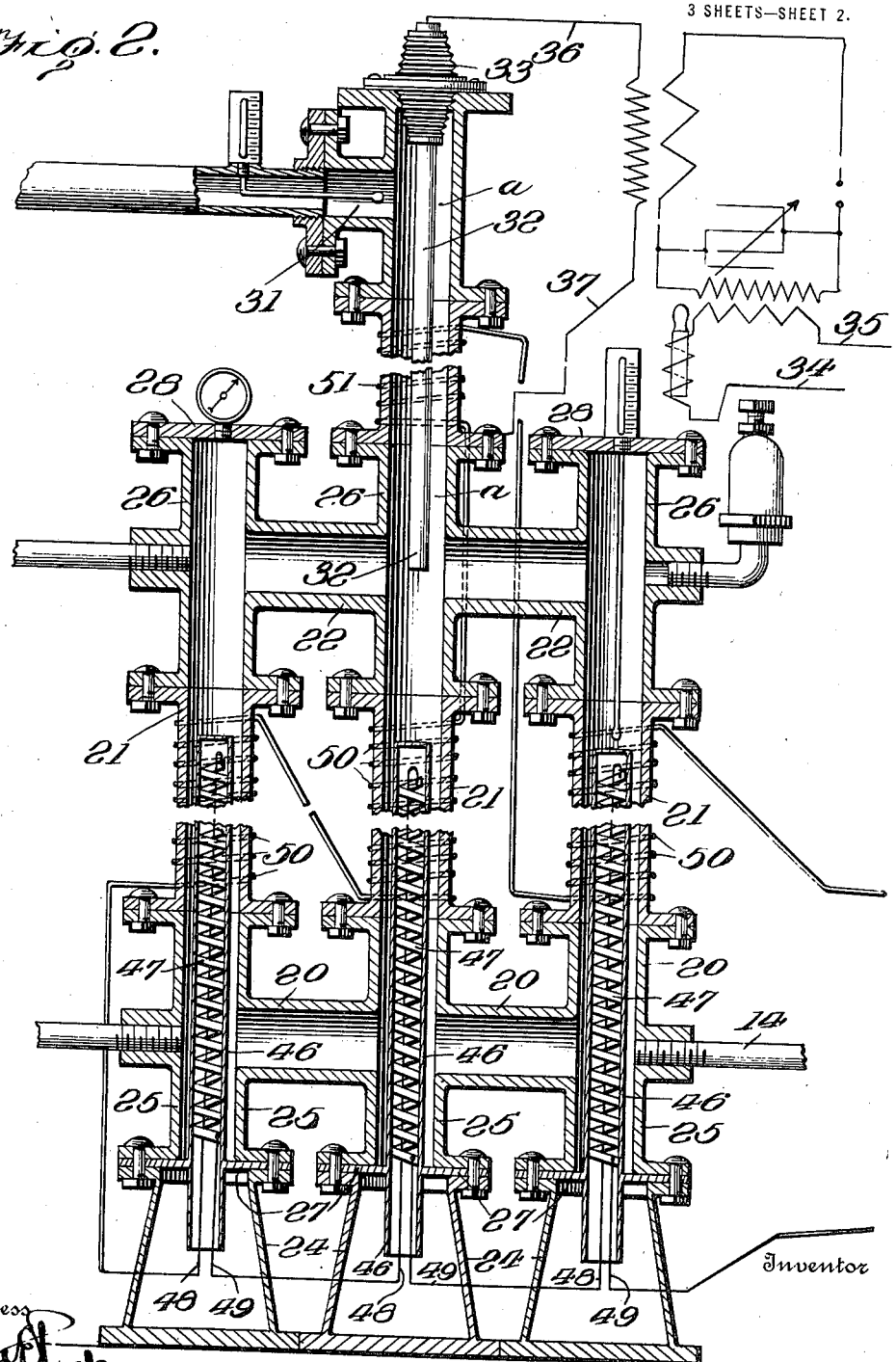

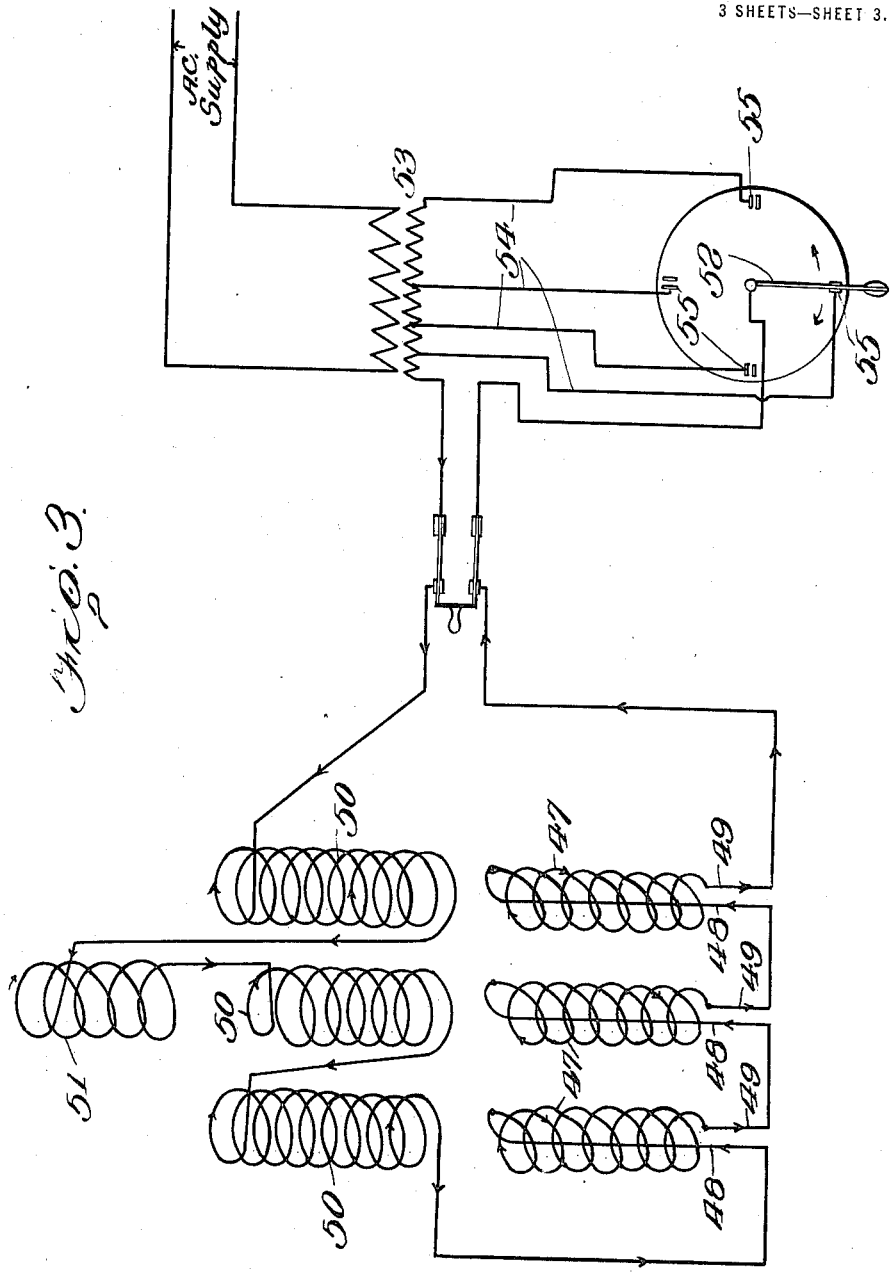

UNITED STATES PATENT OFFICE.

LOUIS BOND CHERRY, OF KANSAS CITY, MISSOURI.

ELECTRICAL APPARATUS FOR THE ELECTROCHEMICAL TREATMENT OF LIQUID HYDROCARBON AND OTHER COMPOUNDS.

1,327,023.  Specification of Letters Patent.  Patented Jan. 6, 1920.

Application filed February 26, 1916. Serial No. 80,707.

*To all whom it may concern:*

Be it known that I, LOUIS BOND CHERRY, a citizen of the United States, and resident of Kansas City, Jackson county, and State of Missouri, have invented certain new and useful Improvements in and Relating to Electrical Apparatus for the Electrochemical Treatment of Liquid Hydrocarbon and other Compounds, of which the following is a specification.

This invention relates to certain improvements in and relating to electrical apparatus for the electrochemical treatment of liquid hydrocarbon and other compounds; and the objects and nature of the invention will be readily understood by those skilled in the art in the light of the following explanations of the accompanying drawings illustrating what I now believe to be the preferred mechanical expression or embodiment of my invention from among other forms, arrangements and combinations within the spirit and scope thereof.

An object of the invention is to provide apparatus for vaporizing hydrocarbon distillates and the like; heating and mixing a gas with such vaporized compound, and then subjecting the gas and vapor mixture to a peculiar silent electrical discharge preparatory to condensing the final product and separating any remaining gas therefrom.

A further object of the invention is to provide improved means for vaporizing hydrocarbon distillates and the like through the medium of easily controlled heating elements designed and arranged to reduce to the minimum possibility of "cracking" and destructive distillation.

A further object of the invention is to provide improved apparatus for vaporizing liquid hydrocarbons and the like and avoiding "cracking" and destructive distillation thereof, and for heating and mixing gas therewith for treatment by the silent discharge of an oscillatory bipolar high frequency electric current.

A further object of the invention is to provide apparatus for subjecting vapors and gases, or either, to the silent discharge of an oscillatory high frequency electric current and for condensing the resulting compound or compounds.

A further object of the invention is to provide an improved still or vaporizer provided with electric means for heating the liquid being treated.

A further object of the invention is to provide a still or vaporizer embodying improved electric heating means for vaporizing oils or other products without substantial cracking or destructive distillation thereof and to avoid setting up magnetic conditions that might exert a disadvantageous influence on the oil or other compound being vaporized.

A further object of the invention is to provide improvements in parts and combinations for the production of a highly efficient apparatus for the electrochemical treatment of hydrocarbon compounds and the like.

A further object of the invention is to provide apparatus for carrying out my discovery that liquid hydrocarbon compounds can be changed to vary their gravity and boiling points by treating the same to the silent discharge of an oscillatory high frequency bipolar electric current, into commercial operation.

A further object of the invention is to provide a system for treating and uniting hydrocarbon compounds by electrochemical or other action wherein the hydrocarbon gas and liquid are forced into the still by a single pump designed to simultaneously draw both liquid and gas from sources of supply and to simultaneously force the liquid and gas under the required pressure to supply the still.

A further object of the invention is to provide a still having liquid heating surfaces very extensive in area while the liquid capacity of the still is small, whereby rapid vaporization is attained, and danger of serious explosions due to sudden drop in pressure and consequent rapid vaporization is reduced to the minimum because of the relatively small volume of liquid in the still.

The invention consists in certain novel features in construction, and in combinations and arrangements as more fully and particularly set forth and specified hereinafter.

Referring to the accompanying drawings:

Figure 1, is an elevation somewhat diagrammatically illustrating apparatus embodying my invention.

Fig. 2, shows a form of still or vaporizer of my invention in vertical section, the illustration being largely diagrammatical.

Fig. 3, illustrates diagrammatically the electrical heating units and the controlling devices and circuits therefor.

In the particular embodiment illustrated, petroleum distillates (or other liquid products) and natural gas (or other suitable gas or vapor) are forced by a single pump into the lower manifold of a still or vaporizer that embodies upper and lower manifolds and several vertical pipe lengths, retorts, or heating chambers extending between and joined by the manifolds. The action of the pump or flow of liquid is usually controlled to keep the lower manifold and the upright pipe lengths filled with liquid, with the liquid level usually extending up into the top manifold. The gas is distributed throughout the liquid and hence is heated with the liquid and rises from the liquid mechanically mixed with and of the same temperature as the vaporized liquid.

The upright pipe lengths are provided with external and internal electrical heating units for supplying the heat necessary to vaporize the liquid and these units are so arranged and controlled as to reduce to the minimum possibility of "cracking" and destructive distillation of the liquid. An offtake passage leads from the top manifold to convey the vapors and gases from the still to a suitable condenser. The discharge from this condenser is preferably provided with a liquid and gas separating trap from which the condensed product can be drawn off, and from which any remaining free gas can be drawn off by the pump for re-entry into the still or vaporizer.

In the offtake passage from the still, I form an electric treating chamber wherein the vapors and gases are subjected for a more or less extended period of time to the molecular structure re-arranging influence of the silent discharge of an oscillatory high frequency bipolar electric current which is under the control of the operator so that the frequency of the current can be varied to produce the desired product which is determined by testing the liquid discharged from the condenser.

In the drawings, I indicate any suitable tank 1, in which is maintained a supply of comparatively low gravity hydrocarbon oil or distillate which is to be raised by treatment approximately as described, to a higher gravity hydrocarbon compound, and 2, is the natural or other hydrocarbon gas supply pipe.

3, is a reciprocating pump having suction pipe 4, leading from the liquid in the tank and usually therein provided with a suitable foot valve (not shown). The pump inlet is provided with a check valve adjacent to the discharge of the suction pipe 4, into the pump cylinder, and the gas supply pipe 2, opens into the suction pipe adjacent to the pump cylinder so as to be subject to the suction of the pump on its suction stroke. The pipe 3, is provided with a suitable check valve 7, and with a needle or other suitable gas flow regulating and cut off valve 8.

The discharge port from the pump is provided with a check valve to open only on the compressing stroke of the pump, and the pump discharge pipe 10, leads from this port, and is provided with an upper branch 11, opening into the upper portion of the interior of pressure equalizing tank 12, and with a lower branch 13, opening into the lower portion of tank 12.

The oil or liquid is driven into the still through pipe 14, receiving its supply of liquid either direct from the equalizing tank or from pipe 13, and this pipe 14, is provided with valve 15, whereby the supply of liquid to the still is controlled and cut off, and with check valve 16, to prevent back flow from the still.

The liquid pressure pipe 13, is also usually provided with a pressure relief valve 17, having a suitable overflow or discharge into tank 1.

The gas under the necessary pressure is conveyed to and discharged into the still through pipe 18, from the upper portion of the pressure equalizing tank 12, and this pipe 18, is provided with check valve 19, to prevent back flow from the still.

The equalizing tank 12, is closed and can be provided with any suitable gages and indicators as will be readily understood by those skilled in the art.

The natural or other gas can be supplied to pipe 2, from any suitable source, such as a gasometer, (not shown) and the tank 1, can be supplied with oil or distillate from any suitable source.

On its suction or down stroke the pump piston will draw in a charge of oil and gas, and the gas will collect in the cylinder on top of the oil resting on the piston. On its up or forcing stroke the pump inlet will be closed by its check valve, and the gas will be first forced out through pipe 10, and then the oil will be forced out so that on its down stroke the pump will remain primed by the liquid.

The proportion of gas admitted can be controlled with such degree of accuracy as may be required by manipulation of the valve 8, which is usually a needle valve. This valve is closed when starting up the pump, and is not opened until the pump is primed. This valve can also be closed to shut off the supply of gas, should it be desired to force liquid only into the still.

The oil and gas will usually separate by gravity where the pipe 10, branches so that gas will flow through pipe 11, into the top of tank 12, and oil through pipe 13, into the bottom of tank 12. The oil and gas accumulate in tank 12, until the pressure therein is sufficient to overcome the pressure in the still. This tank maintains a supply of oil and gas under approximately steady pressure, and will take care of the oil pumped while the valve 15 is closed and before the flow of gas is started through the pump.

The still I prefer to employ embodies one or more vertical pipe lengths or retorts of comparatively small diameter and cylindrical form, at their lower ends opening into a head or manifold and at their upper ends opening into another head or manifold from which the mixture of vapor and gas is drawn off.

In the specific example illustrated, I show a horizontally-arranged lower head or manifold 20, into which the oil supply pipe 14, discharges. The gas supply pipe 18, in this instance, is arranged exteriorly and longitudinally of said lower head and discharges thereinto through a number of spaced manually adjustable needle valve controlled nozzles 18ª. In this particular example, I show three vertical spaced tubular portions, retorts or pipe lengths 21, rising from, coupled to and opening into said lower head so as to receive their supplies of oil or liquid therefrom, while at their upper ends these pipe lengths are secured to and open into the horizontally arranged top head or manifold 22, which is located above said pipe lengths. The lower head 20, can be provided with upwardly projecting necks or branches to which the lower ends of the pipe lengths are coupled while the upper head or manifold can be provided with depending necks or branches to which the upper ends of the pipe lengths are coupled. I show the still mounted on and supported by hollow pedestals 24, bolted or otherwise fixed to hollow necks 25, depending from the lower head and vertically alined with the pipe lengths or vertical tubular portions 21, and provided with suitable internal closures 27.

The top head or manifold 22, is shown formed with upwardly projecting necks or branches 26, vertically alined with the tubular portions 21, respectively, and provided with suitable closures 28, where not forming a portion of the vapor and gas mixture discharge from the still, the liquid in the still being rapidly vaporized by proper application of heat without destructive distillation, and under the desired pressure.

In the particular example illustrated, I show the center branch 26, of the top head forming the discharge outlet of the still and a portion of the offtake conduit leading from the still to any suitable condenser 29.

In the example illustrated, this conduit comprises a vertical pipe length 30, in upward continuation of the center branch 26, of the still, and at its upper portion having a lateral branch outlet 31, having pipe connection to the still. The vertical portion of this conduit that rises from the still forms an electric treating chamber $a$, in which the hot mixture of vapor and gas is subjected to the silent discharge of a bipolar high frequency oscillatory electric current in accordance with the method set forth by my patent application filed February 21, 1916, S. No. 79,763.

The discharge conduit and top head of the still are composed of metal or other good conductor of electricity, and the walls thereof form one electrode. The other electrode 32, is in the form of a rod arranged centrally within and longitudinally of the treating chamber $a$, and that depends throughout the length of the vertical portion of the conduit into the top manifold, from and is supported by insulator 33, fitted in the upper end of said vertical portion of the conduit.

The power is supplied from any suitable source of alternating current through wires 34, 35, to various instrumentalities and through wire 36, to the electrode 32, and through wire 37 to the opposite electrode formed by the wall of the still and conduit therefrom. The instrumentalities provide a high frequency oscillatory bipolar electric current and are arranged to produce a silent discharge flowing back and forth across the heating chamber between the surrounding metal walls and the center electrode. Certain of the instrumentalities are manually adjustable so that the voltage and frequency can be varied during the operation to produce the particular product desired and to this end the product from the condenser can be tested from time to time and the voltage and frequency of the silent electric discharge can then be varied as may be required to attain the desired result. The hot mixture of vapor and gas flows up through chamber $a$, wherein it is approximately subject to the heat and pressure conditions existing in the still, and is also subject to the peculiar silent electrical discharge which causes a re-arrangement of the molecular structures of the vapor and gas and a chemical union thereof without loss of carbon so that the resulting compound that flows through outlet 31, to the condenser is different as to percentage of hydrogen from the liquid introduced into the still with some free gas if a surplus volume of gas was introduced into the still. This compound is condensed in the condenser and discharges therefrom into vertical separating trap or chamber 38, the gas rising to the top of the chamber and the liquid settling therein. The liquid is drawn off through pipe 39, having a suitable pressure controlling and cut off valve 40, while the gas is drawn off through pipe 41, having a pressure controlling and cut off valve 42. The gas from pipe 41, is preferably conducted to the gasometer (not shown) from which pipe 2, receives its supply. The separating trap 38, is usually equipped with a gage 38', to show the height of the liquid in the trap chamber so that the operator can determine whether to increase or decrease the proportion of gas fed through the needle valve controlled nozzles 18ª, and to the pump 3. A surplus proportion of gas is preferably supplied to the still to make sure that more than enough hydrogen is present in the electric heating chamber for union with the vapor therein.

In operation, the still is filled with liquid up into the top head or manifold, the liquid level being maintained usually at a point in the top head.

Any suitable indicating means can be provided to enable the operator to be constantly advised as to the liquid level in the still. For instance, I show a sight gage 44, for this purpose. The still can also be provided with a safety valve and various temperature and pressure indicators as will be readily understood by those skilled in the art.

The necessary oil vaporizing heat is applied to the liquid in the still through the medium of electrical heating units, whereby the temperature in the still can be accurately and easily controlled and maintained. It is desirable to so control the temperature as to reduce to the minimum all possibility of "cracking" and destructive distillation, and yet so as to maintain a sufficiently high temperature to produce rapid vaporization and the desired pressure and heat conditions in the still most advantageous for the proper conduct of the electrochemical treatment of the vapor and gas mixture in the treating chamber.

In the example illustrated, I show each vertical tubular unit of the still equipped with a central longitudinal internal heating core whereby an annular liquid heating chamber or passage is provided within the wall of the unit and around the core. For instance, each unit of the still is provided with a hollow metallic core 46, which is closed and imperforate within the still but which is open at its lower end for the passage of electric conductors. In this instance, this hollow core rises from and extends through the bottom closure 27 of the still immediately below the tubular unit 21, and is open at its lower end below the still and within the pedestal 24. The hollow core rises from the closure 27, and extends through the bottom head 20, and upwardly in the tubular unit and at its upper end terminates therein below the liquid level in the still. The exterior diameter of the core is less than the internal diameter of the tubular unit, so that the portion of the core within the still is entirely surrounded by the liquid in the still. Within this core I longitudinally arrange a suitably insulated comparatively high resistance heating coil 47, which if so desired can be formed of flat or ribbon like metal suitably coiled in the same direction (either clockwise or anti-clockwise) throughout its length with its opposite terminals connected into the alternating current power circuit by suitable conductors 48, 49 entering the lower open end of the core. This coil is designed to heat the core and the liquid in which the core is submerged, by conduction and radiation.

I also preferably provide each tubular unit 21, of the still with a suitably insulated exterior electrical coil 50, arranged longitudinally thereof and suitably connected into the same alternating current power circuit as the resistance coil in the core.

This coil 50, is not a high resistance or heating coil, but is composed of a good conductor of electricity and by reason of the alternating current employed and its spiral winding around the metal tubular unit generates so-called eddy currents of electricity in the wall of the unit which causes the unit to heat and by radiation raises the temperature of the oil, as will be readily understood by those skilled in the art.

These inner and outer coils of a tubular unit of the still are so relatively wound and electrically connected that the instantaneous voltage applied to both coils will produce a magnetic flux in the same general direction in order to reduce to the minimum the lines of magnetic force that pass through the liquid in the still.

I also preferably arrange a coil 51, on the exterior of the pipe length 30, surrounding a portion, at least, of the electric heating chamber, to maintain the desired temperature in said chamber. This coil 51, is composed of a spirally wound good conductor of electricity and is similar to a coil 50, in electrical formation and action.

The various coils can be connected up in any suitable manner under which the coils will produce the results desired, although in the diagram Fig. 3, I show all of the coils connected in series and so relatively wound as to avoid the magnetic action on the liquid hereinbefore referred to. In the diagram arrows indicate the direction of instantaneous flow at any instant, although at the next instant the flow will be reversed.

I preferably provide a suitable controller such as indicated by Fig. 3, whereby the heat in the still can be accurately and conveniently controlled manually to produce the results desired, as will be understood by those skilled in the art.

In the present instance, I show each tubular unit of the still equipped with an interior heating element and also with an exterior heating coil, and I show the still composed of three units, and only one off-take passage and treating chamber, it is obvious however, that I can employ one or more tubular units and that each unit can have its own discharge conduit and treating chamber, and furthermore that each vaporizing unit can be equipped with only an interior or with only an exterior heating element or coil. I particularly call attention to the fact that high temperature of the liquid can be maintained by employing only the exterior coils 50 (omitting the internal heating elements 46, 47) and that although the apparatus I now employ contains the tubular vaporizing units equipped with both the internal heating elements and the exterior coils, yet I am of the opinion that the desired results can be attained by the employment of the exterior coils alone.

In practice, the still is inclosed in a thick covering or coating of suitable insulating material to protect the electric coils and to retain the heat and aid in maintaining the desired high temperature throughout the entire still and the electric treating chamber.

So far as certain broad features of my invention are concerned, I do not wish to limit my invention to any particular still construction and heating means therefor, nor to any particular manner of or means for introducing the compound or compounds to be treated into the still.

As to other features of my invention, I do not wish to limit the invention to treatment of any particular compound or compounds, nor to the method herein described wherein low gravity distillates are treated in the presence of natural or other hydrogen carrying gas.

With reference to the particular still construction illustrated, I find that it possesses material advantages where rapid vaporization under high pressure and heat is required, inasmuch as the liquid capacity of the still is comparatively small and the heating surfaces comparatively extensive in area and the structure is such as to render it capable of being built of excessive strength against internal pressure.

The particular tubular unit arrangement leads to rapid vaporization and upward flow of the liquid into contact with the metal heating surfaces, and also the necks 25, 26, are alined with the tubular units so that access can be easily gained to the interior thereof for cleaning and repair.

The still can be adapted for "cracking" and destructive distillation purposes and processes, and also for liquid vaporization purposes.

The discharge of gas into the still can be accurately regulated to increase or diminish the proportion introduced and to bring about approximately uniform distribution of the gas to the several tubular units, by manually manipulating the needle valves in the gas inlets 18ª. Advantages are also attained by arranging these inlets in the lower head of the still, each directly below or in line with a tubular unit so that each unit will receive its proper share of gas and so that the gas will flow from the inlets directly up into the tubular units.

The particular means illustrated as constituting the controller for the heat generating current comprises a transformer 53, the secondary of which is provided with taps 54, leading to the various fixed contacts 55, of the rotary switch which contacts are arranged progressively around the switch center to successively receive the manually adjustable switch contact or blade 52, which is rotatable about the switch center to progressively increase or decrease the current which flows in the heating coils with a consequent increase or decrease of the temperature of the still.

It is evident that various changes, modifications and variations might be resorted to without departing from the spirit and scope of my invention and hence I do not wish to limit myself to the exact disclosures hereof but consider myself entitled to all departures within the essence and meaning of the following claims.

What I claim is:—

1. Apparatus for treating a liquid hydrocarbon compound, embodying, means for introducing hydrogen carrying gas into said liquid, means for vaporizing said liquid, means for electrically treating the mixture of vapor and gas to produce a compound of different gravity from that of the original liquid, and means for heating said mixture while being thus treated.

2. In electrochemical apparatus, in combination, a still, a condenser connected with the still to receive the gaseous and vaporized compounds therefrom, means for maintaining liquid vaporizing heat in the still, a liquid supply, a gas supply, separate liquid and gas inlets into the lower portion of the still, a single pump in communication with both the liquid and gas supplies for simultaneously receiving liquid and gas therefrom, and connections from said pump to said inlets of the still to convey thereto the gas and liquid forced by the pump.

3. In electrochemical apparatus, in combination, a still provided with means for maintaining liquid vaporizing heat therein, a gas and liquid pressure equalizing tank, gas and liquid pipe connections therefrom to the lower portion of the tank, said connections provided with check valves, a pump connected with gas and liquid supply pipes, and gas and liquid discharge connections from the pump to said tank.

4. In electrochemical apparatus, in combination, a still, means for maintaining liquid vaporizing heat therein, means for discharging liquid to be vaporized into the lower portion of said still, means for discharging gas to be mixed with said vapor into the lower portion of the still, a condenser, an offtake conduit from the top of the still for conducting the hot vaporized mixture from the still to the condenser, and means for subjecting said mixture to the discharge of a high frequency electric current while *en route* from the still to the condenser.

5. In electrochemical apparatus, in combination, a still having a liquid and gas supply, means for maintaining a liquid vaporizing temperature in said still, a condenser, means for conducting the hot vapor mixture from the still to the condenser and subjecting the same to an electrical discharge *en route*, and a liquid and gas separating trap receiving the discharge from the condenser and provided with separate valved liquid and gas offtake connections.

6. In electrochemical apparatus, in combination, a still, means for maintaining a liquid hydrocarbon compound vaporizing temperature in said still, a vaporized mixture offtake conduit from the top of said still including an electric treating chamber subject to the heat and temperature conditions existing within the still, and means for subjecting the hot vaporized mixture in said chamber to the molecular structure re-arranging influence of the silent discharge of a high frequency electric current.

7. In electrochemical apparatus, in combination, a still, means for maintaining liquid hydrocarbon compound vaporizing temperature in said still, and means for subjecting the hot vapor mixture to the molecular structure re-arranging action of the silent discharge of an oscillatory electric current.

8. In electrochemical apparatus, in combination, a still for vaporizing liquid hydrocarbon compounds under controlled temperature, a vaporized compound offtake conduit from the still, means for subjecting the vaporized compound in said conduit to the molecular structure re-arranging action of the silent discharge of a high frequency electric current, and manually adjustable devices for varying the frequency of said discharge.

9. In electrochemical apparatus, in combination, a still for vaporizing liquid hydrocarbon compounds and for heating and mixing gas therewith, an offtake conduit from said still, an electrode centrally and longitudinally arranged in said conduit and insulating from the wall thereof, the wall of said conduit forming the opposing electrode, and means for causing the discharge of a high frequency electric current across said conduit back and forth between said electrodes.

10. In electrochemical apparatus, a liquid hydrocarbon compound vaporizing still comprising upper and lower transverse manifolds or heads, a vapor offtake from the upper manifold, an oil supply into the lower manifold, upright tubular units connecting the manifolds, and electrical coils insulated from contact with the liquid in the still for maintaining liquid vaporizing heat in said units.

11. A still comprising upper and lower heads and an upright tubular unit connecting said heads, means for supplying liquid and gas into the still through the lower head, a gas and vapor mixture offtake from the upper head, and means for maintaining liquid vaporizing heat in said upright.

12. A still comprising a lower head having a liquid supply, an upper head having a vaporized mixture offtake, an upright tubular unit connecting said heads, and electrical means for maintaining liquid vaporizing temperature in said unit embodying a heating core extending across said lower head and longitudinally into said unit and an electric heating element in said core, substantially as described.

13. A still comprising an upright tubular liquid containing unit provided with an exterior coil of good electrical conductor, and an interior heating core containing an electric resistance, and means for passing an alternating electric circuit through said coil and said resistance, said coil and resistance being so arranged and connected as to reduce to the minimum magnetic influences in the liquid in the unit.

14. In apparatus for the electrochemical treatment of liquid hydrocarbon compounds, the combination of a still having means for maintaining a supply of liquid hydrocarbon therein and means for introducing a hydrocarbon gas into said liquid in the still, said still having a vapor and gas discharge conduit, a condenser into which said conduit discharges, a liquid and gas separating trap into which said condenser discharges, said trap having a gas discharge and a liquid discharge, said conduit having an extended portion in and subject to the heat and pressure conditions of the still and forming an electric treating chamber provided with means for subjecting the vapor and gas passing therethrough to the silent discharge of a high frequency electric current.

15. Apparatus for the electrochemical treatment of liquid hydrocarbon compounds comprising a still having an offtake conduit leading to a condenser, said conduit having a portion forming an electric treating chamber provided with means for subjecting the fluids passing therethrough *en route* from the still to the condenser to the molecular structure re-arranging effect of the silent discharge of a high frequency electric current, and manually operated means for varying the frequency of said silent discharge.

16. In combination, a still having an offtake conduit of electrical conducting material, and a good electric conductor spirally wound on the exterior of said conduit and included in an alternating electric power current for generating heat in the conduit by induction.

17. In combination, a lower head having gas and liquid inlets, an upper head having a vapor offtake conduit, an upright tubular unit between and opening into said heads, and means for heating the liquid in said unit.

18. In combination, a lower head having a liquid inlet, and a gas inlet, an upright tubular unit of conducting metal rising from said head and provided with a vapor offtake conduit, and an insulated coil of good conducting material on the exterior of said unit and adapted to be connected with a source of alternating current.

19. A still comprising a lower head or manifold having a liquid inlet, an upper head or manifold having a discharge outlet, and several spaced upright tubular units connecting and at their opposite ends opening into said manifolds, and separate needle valve controlled gas inlets into said lower head and arranged directly below said units so that the gas can pass directly upwardly through the liquid into said units.

20. A longitudinally elongated tubular metal heating conduit having an inlet at one end and an outlet at the other end, means to pass vaporized hydrocarbons through said conduit, means to subject said vaporized hydrocarbons while in said conduit to a silent high frequency electric discharge, and an insulated electrical coil of good conducting material arranged longitudinally of and at the exterior of said conduit and included in an alternating current circuit to heat said conduit by induction, said circuit being provided with adjustable controlling means for progressively increasing and decreasing the temperature maintained in said conduit by the action of the current in said coil on the wall of the conduit.

21. A still comprising transversely arranged opposite manifolds, one of which is provided with a liquid supply inlet, and the other with a vaporized mixture outlet, separate tubular units connecting said manifolds and at their opposite ends opening thereinto, means for maintaining liquid hydrocarbon compound vaporizing temperature in said units, said manifolds provided at their outer sides with closures alined with said units, substantially as described.

22. A still having a tubular portion for containing liquid hydrocarbon and a good electric conductor remote from said liquid and spirally wound on said portion and adapted to be included in an alternating electric power current for generating determined vaporizing heat in said portion.

23. Electrochemical apparatus comprising a vapor treating chamber, means for maintaining vaporizing heat therein, and means for maintaining in said chamber the silent discharge of a high frequency electric current.

24. Electrochemical apparatus comprising a chamber, means for maintaining a silent discharge of a high frequency electric current in said chamber, and manually controlled means for varying the frequency of said current to attain predetermined results in said chamber.

25. Electrochemical apparatus comprising a still having a vapor offtake conduit, means to control the rate of flow of vapor through said conduit, and means to subject the vapor in said conduit to the silent discharge of a high frequency oscillatory electric current.

26. Electrochemical apparatus comprising a still for mixing gas with mineral oils and vaporizing the oils, a condenser, a vapor conduit from the still to the condenser, liquid and gas separating means receiving the discharge from the condenser, and means for electrically treating the mixture of vapor and gas.

27. Electrochemical apparatus comprising separated opposing electrodes included in an oscillatory high frequency electric circuit provided with means for varying the frequency thereof, and means for passing hydrocarbon compounds between said electrodes, substantially as described.

28. A hydrocarbon compound container having a liquid supply, means for discharging gas into the liquid in said container, means for subjecting the mixture of compound and gas to the silent discharge of an oscillatory high frequency electric current, and means for heating said mixture while being subjected to said discharge.

LOUIS BOND CHERRY.